United States Patent

Dassanayake

[11] Patent Number: 5,452,186
[45] Date of Patent: Sep. 19, 1995

[54] LIGHT DISTRIBUTION SYSTEM

[75] Inventor: Mahendra S. Dassanayake, Farmington Hills, Mich.

[73] Assignee: Ford Motor Company, Dearborn, Mich.

[21] Appl. No.: 221,219

[22] Filed: Mar. 30, 1994

[51] Int. Cl.⁶ .................................. B60Q 3/02
[52] U.S. Cl. ........................ 362/80; 362/26; 362/32; 362/74
[58] Field of Search ............ 362/26, 32, 61, 80, 362/74, 83.3, 27

[56] References Cited

U.S. PATENT DOCUMENTS

| | | | |
|---|---|---|---|
| 3,278,739 | 10/1966 | Royka et al. | 362/32 |
| 3,638,008 | 1/1972 | Keller et al. | 362/32 |
| 3,786,243 | 1/1974 | Ilzig et al. | 362/32 |
| 4,735,495 | 4/1988 | Henkes | 362/32 X |
| 4,883,333 | 11/1989 | Yanez | 362/32 X |
| 4,897,771 | 1/1990 | Parker | 362/32 X |
| 5,184,883 | 2/1993 | Finch et al. | 362/32 |
| 5,222,793 | 6/1993 | Davenport et al. | 362/32 |
| 5,321,586 | 6/1994 | Hege et al. | 362/32 |

*Primary Examiner*—Stephen F. Husar
*Attorney, Agent, or Firm*—Kevin G. Mierzwa; Roger L. May

[57] ABSTRACT

A light distribution system for an automotive vehicle is provided having a light source mounted in a fixed location in the vehicle. A plurality of light pipes is located in a fixed relation to said light source with each light pipe having a first and second end. The first ends each light pipe having a face which in combination substantially form a ring having a predetermined width with an outer diameter and an inner diameter. A collector for coupling light emitted by the light source into the first ends of the light pipes reflects the light on the faces of the light pipes in a ring-shaped pattern having a predetermined area.

6 Claims, 3 Drawing Sheets

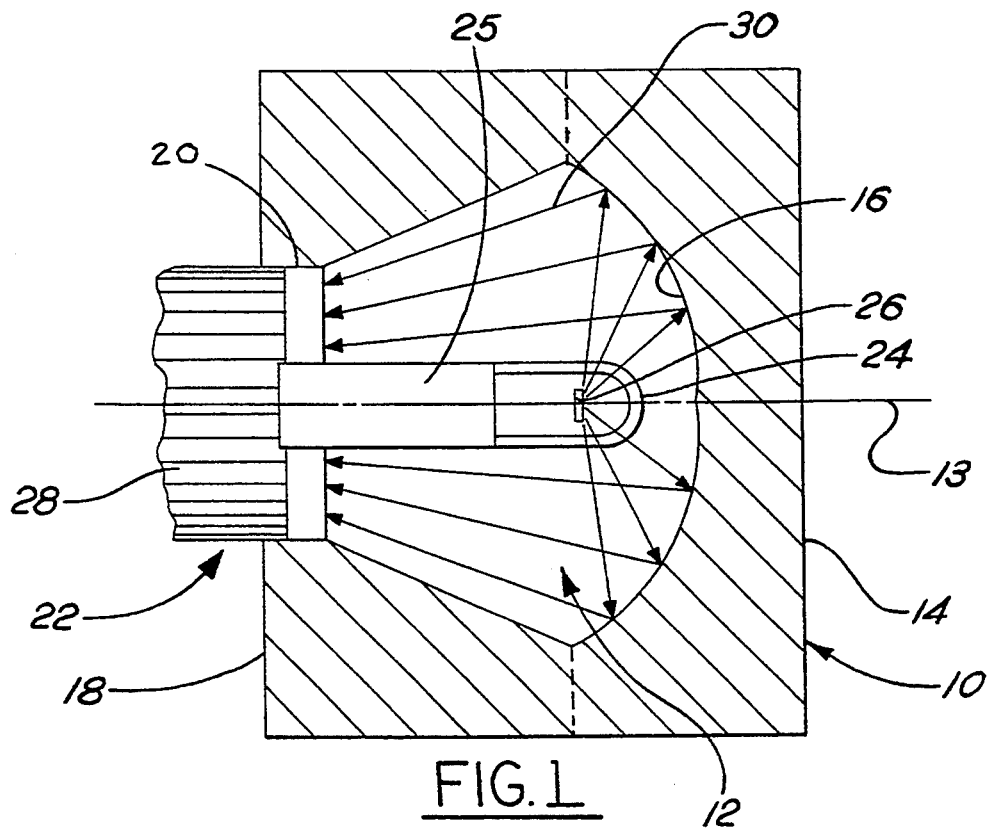
FIG. 1
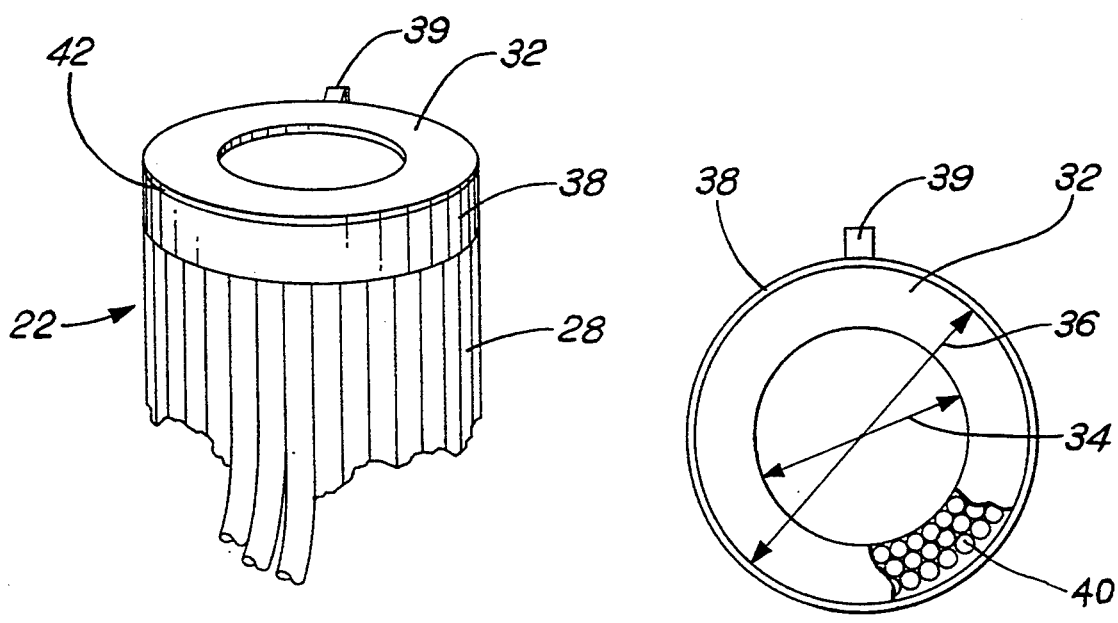
FIG. 2
FIG. 3

LIGHT DISTRIBUTION SYSTEM

BACKGROUND OF THE INVENTION

The invention relates generally to a light distribution system for an automotive vehicle and more specifically to such a light distribution system having a light collector for distributing light from a light source over a predetermined area.

Light distribution systems which use fiber optics to distribute light to various locations in a vehicle are generally known. For example, U.S. Pat. No. 3,278,793 uses optical fibers to direct light through pipes to various locations. However, such light is concentrated over a small area on the faces of the light pipes. When the light is concentrated in such a small area, heat is not dissipated sufficiently and is built up in the light collection area. This localized heating can shorten the life of light pipes by discoloring or deforming them.

It would therefore be desirable to provide a light distribution system which collects light into a plurality of light pipes while avoiding heat concentration on the face of the light pipes.

SUMMARY OF THE INVENTION

One advantage of the present invention is that light is reflected from a collector in a wide area and thus heat is distributed over a wide area which prevents damaging heat build-up on the area of light distribution.

The light distribution for an automotive vehicle of the present invention has a light source mounted in a fixed location in the vehicle. A plurality of light pipes is located in a fixed relation to said light source with each light pipe having a first and second end. The first ends each light pipe having a face which in combination substantially form a ring having a predetermined width with an outer diameter and an inner diameter. A collector for coupling light emitted by the light source into the first ends of the light pipes reflects the light on the faces of the light pipes in a ring-shaped pattern having a predetermined area.

BRIEF DESCRIPTION OF THE DRAWINGS

FIG. 1 is a diagrammatic cross sectional view of the light collector according to the preferred embodiment of the present invention.

FIG. 2 is a perspective view of a light pipe bundle according to the preferred embodiment of the present invention.

FIG. 3 is a top view of the ring area formed by the combination of the light pipe faces.

DETAILED DESCRIPTION OF THE PREFERRED EMBODIMENT

Figure 4:
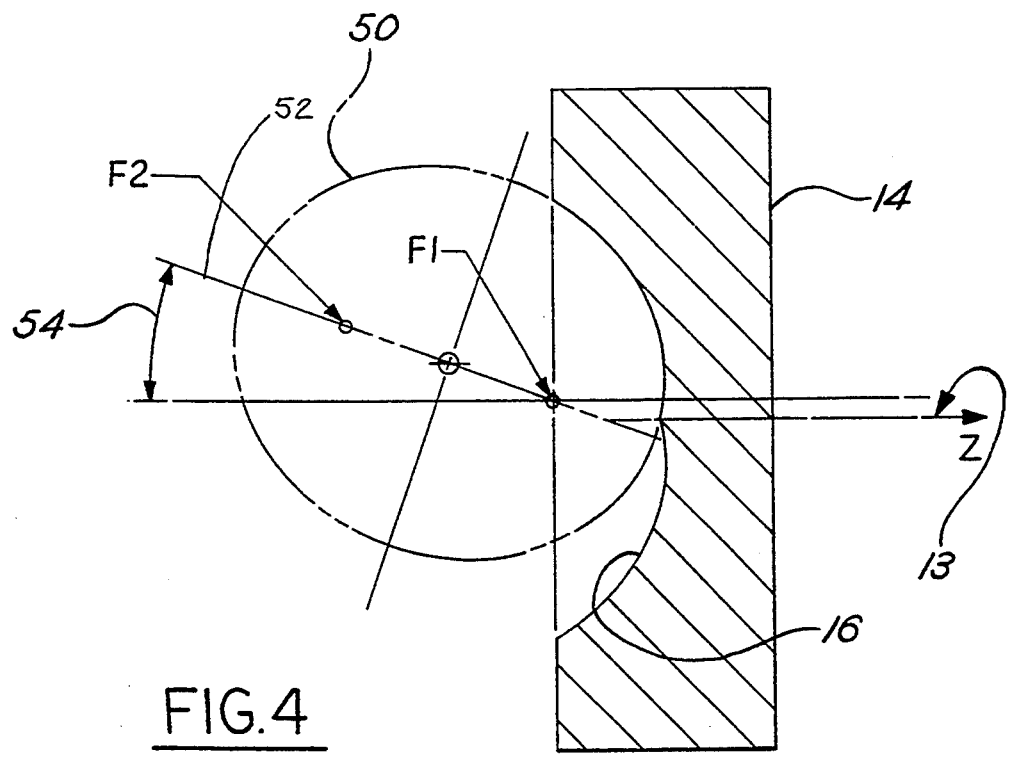
FIG. 4 is a section of a portion of the housing and the ellipse illustrative of the construction of the reflective surface.

Referring now to FIG. 1, a housing 10 generally encloses a chamber 12 having an axis of symmetry 13. Housing 10 is preferably divided into two portions and is made of a plastic material such as a thermoset or thermoplastic to facilitate manufacturability. The first portion is a reflector portion 14 for reflecting light rays 30 having a reflecting surface 16 made of aluminum or other suitable reflecting material commonly known in the art. The geometry of reflecting surface 16 will further be described in conjunction with FIG. 4 below.

The second portion of housing 10 is a securing portion 18 which has an aperture 20 located opposite reflecting surface 16. Securing portion 18 is fixedly connected to reflector portion by means of a glue, screws or other fastening means (not shown).

An aperture 20 is farmed the securing portion 18 and is sized to receive a light ring assembly 22 which comprises a series of light pipes 28 disposed around light bulb 24. Light pipes 28 are made of a common light conducting material such as plastic or glass.

Light bulb 24 projects from a longitudinally extending base 25 which is preferably circular in cross section and is aligned parallel to and preferably collinearly with the axis of symmetry 13 and is centrally located in light bulb 24. One example of such a light bulb is a General Electric GE-882X-GC. Light bulb 24 is preferably removable from base 25. Light bulb 24 has a filament 26 which is preferably oriented in a direction perpendicular to axis of symmetry 13. Filament 26 has a region of increased intensity which is a known characteristic of light bulb 24. For example, in the GE bulb described above the midpoint of one half of filament 26 provides this more intense region of light emission. This region on the above described bulb is 1 mm from the midpoint of the length filament 26.

Referring now to FIGS. 2 and 3, light assembly 22 is comprised of a series of light pipes 28 arranged in a ring 32 which has an inner diameter 34 and a outer diameter 36. Light assembly 22 is removably carried within aperture 20 for servicing light bulb 24. Inner diameter 34 of ring 32 is formed around base 25. A retainer 38 defines outer diameter 36 of light assembly 22. Retainer 38 is preferably a plastic ring used to hold light pipes 28 and base 25 together. Retainer 38 has a key 39 which mates with a groove (not shown) in aperture 20 to ensure proper orientation and depth of the bulb 24 within aperture 20.

The area of ring 32 is derived from the specific application. For example, if light is needed in eight locations, eight light pipe bundles would be used. A typical light pipe bundle has approximately 8 to 12 individual light pipes. The ends of the light pipe bundles are unbundled and the individual light pipes 28 are secured around lamp base 25 with retainer 38. Each light pipe 28 has a face 40 which is preferably cut to form a generally planar surface when bundled together around base 25 in the ring shape.

Faces 40 can be covered by a filter 42 which will change the color of light received into light pipes 28 and consequently the light emanated from light pipes 28.

Referring now to FIG. 4, reflective surface 16 is a generally concave region in reflector portion 14 of housing 10. Generally speaking, the reflective surface is formed by rotating an ellipsoid (represented in two-dimensional formed by ellipse 50) about axis of symmetry 13. Ellipse 50 has a major axis 52, a first focal point F1 and a second focal point F2. First focal point F1 preferably lies a predetermined distance from axis of symmetry 13. Major axis 52 is elevated at an angle 54 from a line parallel to axis of symmetry 13 with first focal point F1 as the vertex of angle 54. When the major axis 52 of ellipse 50 is rotated about the axis of symmetry, first focal point F1 and second focal point F2 circumscribe a circle around axis of symmetry 13. Angle 54 is determined so that the locus of second focal point F2 points generally lies between outer diameter 36 and inner diameter 34. Angle 54 is a constant when focal points F1 and F2 circumscribe a circle about axis of symmetry 13. Preferably, the circle of second focal points F2 lies at the midpoint between outer diameter 36 and inner diameter 34. As an alternative to the above-described embodiment, the major axis 52 can be rotated in an elliptical pattern, i.e., not a constant angle, around axis of symmetry 13 so that focal points F1 and F2 circumscribe an ellipse.

The location of first focal point F1 in relation to the axis of symmetry 13 will determine the width of the reflected ring. The further the focal point F1 is away from axis of symmetry, the wider the beam pattern is on ring 32. The distance F1 should be placed from axis of rotation is determined by the direct angular relation corresponding to the width of ring 32. For example, if outer diameter 36 is 18 mm and inner diameter 34 is 10 mm, ring 32 would have a 4 mm wide thickness. Angle 54 would be a constant 0.29° if the brightest portion of filament is 1 mm from the axis of symmetry 13 and the distance between first focal point F1 and second focal point F2 is 21.190 mm. As a result, the light generated by light bulb 24 is reflected over a relatively large area, and consequently heat is also broadcast over a relatively large area. For interior lighting applications in an interior of an automotive vehicle, the flux density upon the faces of light pipes 28 should be no less than about 0.5–0.6 lumens/mm$^2$.

Figure 5:
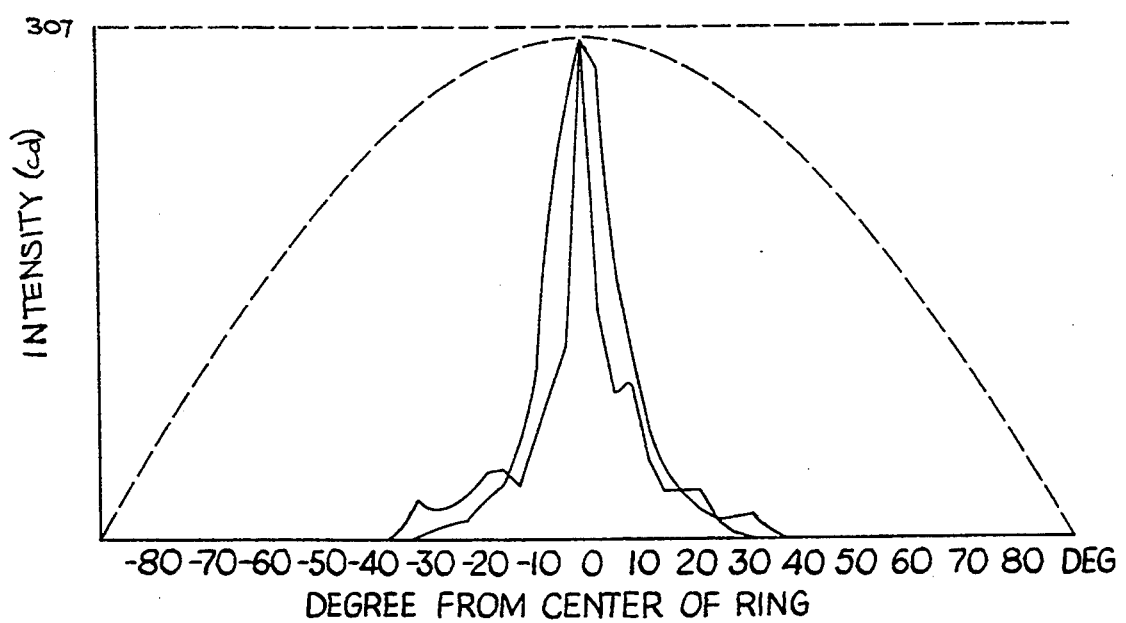
FIG. 5 is a polar plot of the distribution of light over two cross sections of the ring of light.

Referring now to FIG. 5, a polar plot shows the light distribution at two locations on the ring 32. Light when distributed in the ring shape is distributed over a wide area providing for less light and consequently less heat concentration at any one point as compared to the prior art. For example, the peak light intensity shown is 307 cd., which is several times less than if the light were concentrated at one or two points. This corresponds to a flux density of 0.5 or 0.6 lumens per square millimeter. The center of the polar plot represents the center of the width of ring 32 where reflective surface 16 is focused. As the radial degree from the center of the width of ring 32 increases the light falling on the faces of light pipes 28 decreases. This spread of light corresponds to the distance first focal point F1 is from the axis of symmetry 13. If the focal point of ellipse 50 where moved further from axis of symmetry 13, the spread of light around focal point F2 would be greater. If the focal point of ellipse 50 where moved to the axis of symmetry 13, light would be more concentrated at a circle containing all the second focal points F2. As shown in this configuration, the light is distributed over a large area and localized heating of individual light pipes is avoided.

Figure 6:
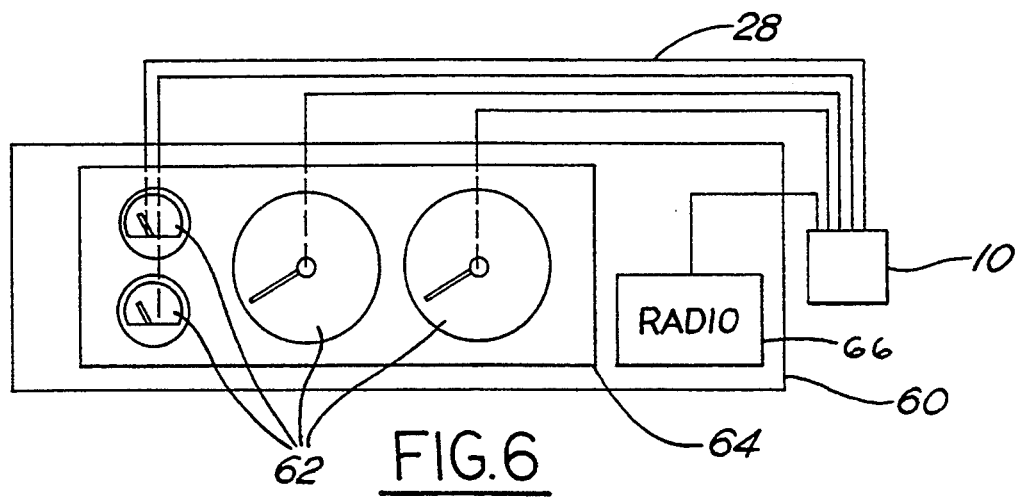
FIG. 6 is a light distribution system which is connected to gauges in an instrument cluster of an automotive vehicle.

Referring now to FIG. 6, an entire light distribution system includes housing 10, light pipe 28, and the desired object which is to be illuminated. Housing 10 contains the light collector which focuses the light from a light source into a ring-shaped pattern (as described above). In one embodiment, housing 10 is mounted within an instrument panel 60 of an automotive vehicle. Light pipes 28 are connected to portions of instrument panel 60 where illumination is desired. For example, light pipes 28 are connected to gauges 62 of an instrument cluster 64 to provide backlighting for gauges 62. Light pipes 28 can also be used to illuminate a portion of the radio 66.

Figure 7:
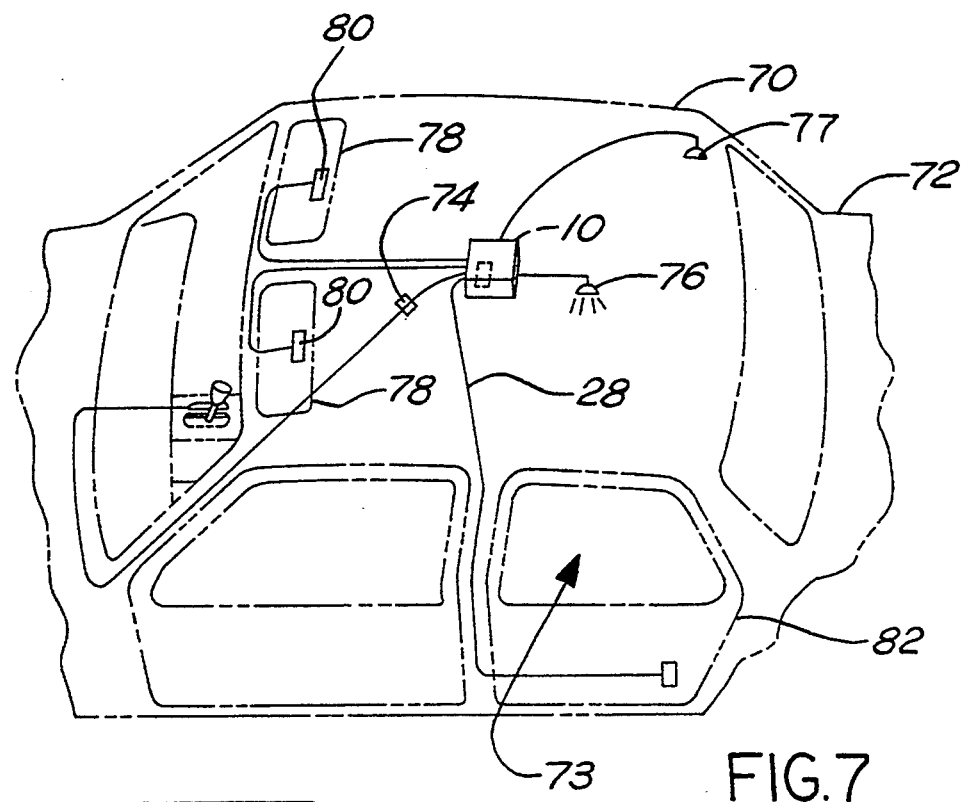
FIG. 7 is a passenger compartment of an automotive vehicle having a light distribution according to preferred embodiment.

Referring now to FIG. 7, another implementation for the ring collector is mounting housing 10 to the roof 70 of an automotive vehicle 72. A shutter switch 74 connected in series with any light pipe 28 is used to control the light distribution through the various light pipes 28 within passenger compartment 73. Shutter switch 72 simply blocks the light travelling through the light pipe 28 to which it is attached. Variations of the switch are generally known to one skilled in the art.

One light pipe 28 is routed to a dome reflector 76 which controls the general illumination of the passenger compartment. Dome reflector 76 is shaped to spread the light emanating from light pipe 28. Another location in the vehicle which the light pipes 28 may be connected is the vanity mirrors 80 located on either sun visor 78. Still another location light pipes 28 may be connected to a door 82 to illuminate any switches. Yet another location which light pipes 28 may be connected to a map light reflector 77.

Figure 8:
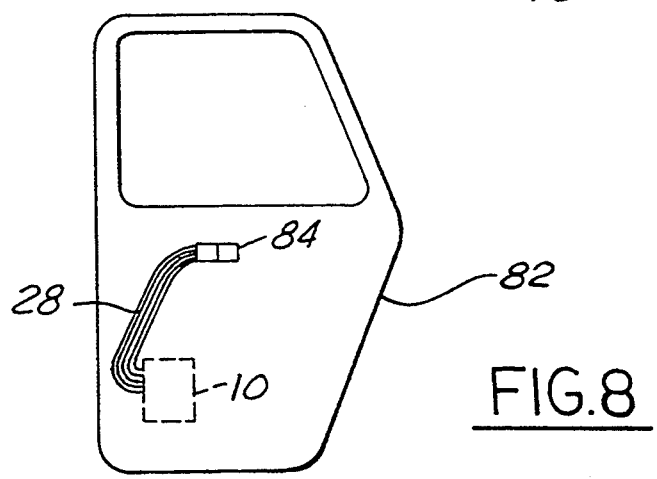
FIG. 8 is a door of an automotive vehicle containing a light distribution system according to the preferred embodiment of the present invention.

Referring now to FIG. 8, housing 10 may also be mounted within door 82 if illumination is desired in several locations within door 82. For example, light pipes 28 may be run to a block of switches 84 which may include power window switches, power lock switches, ashtray lights.

Various modifications and applications of the novel light distribution system will be apparent to those skilled in the art. All such modifications variations would be within the scope of this invention.

What is claimed is:

1. A light distribution system for an automotive vehicle having a passenger compartment with a dome reflector and a map light reflector contained therein, a roof panel, and at least one door having a switch and an instrument cluster, said light distribution system comprising:

a light source mounted in a fixed location in the vehicle;

a plurality of light pipes located in a fixed relation to said light source, each light pipe having a first and second end, said first end having a face, said faces in combination substantially forming a ring having a predetermined width, said ring having an outer diameter and an inner diameter; and collector means for coupling light emitted by said light source into said first ends of light pipes by reflecting said light on said faces of said first ends of light pipe in a ring-shaped pattern having a predetermined area;

wherein said second ends of said light pipes are connected to portions of said instrument cluster.

2. A light distribution system for an automotive vehicle having a passenger compartment with a dome reflector and a map light reflector contained therein, a roof panel, and at least one door having a switch and an instrument cluster, said light distribution system comprising:

a light source mounted in a fixed location in the vehicle;

a plurality of light pipes located in a fixed relation to said light source, each light pipe having a first and second end, said first end having a face, said faces in combination substantially forming a ring having a predetermined width, said ring having an outer diameter and an inner diameter; and collector means for coupling light emitted by said light source into said first ends of light pipes by reflecting said light on said faces of said first ends of light pipe in a ring-shaped pattern having a predetermined area;

wherein said second end of at least one of said light pipes is connected to said dome reflector to substantially illuminate said passenger compartment.

3. A light distribution system for an automotive vehicle having a passenger compartment with a dome reflector and a map light reflector contained therein, a roof panel, and at least one door having a switch and an instrument cluster, said light distribution system comprising:

a light source mounted in a fixed location in the vehicle;

a plurality of light pipes located in a fixed relation to said light source, each light pipe having a first and second end, said first end having a face, said faces in combination substantially forming a ring having a predetermined width, said ring having an outer diameter and an inner diameter; and collector means for coupling light emitted by said light source into said first ends of light pipes by reflecting said light on said faces of said first ends of light pipe in a ring-shaped pattern having a predetermined area;

wherein said distribution means is connected to said map light reflector.

4. A light distribution system for an automotive vehicle having a passenger compartment with a dome reflector and a map light reflector contained therein, a roof panel, and at least one door having a switch and an instrument cluster, said light distribution system comprising:

a light source mounted in a fixed location in the vehicle;

a plurality of light pipes located in a fixed relation to said light source, each light pipe having a first and second end, said first end having a face, said faces in combination substantially forming a ring having a predetermined width, said ring having an outer diameter and an inner diameter; and collector means for coupling light emitted by said light source into said first ends of light pipes by reflecting said light on said faces of said first ends of light pipe in a ring-shaped pattern having a predetermined area;

wherein said collector means secured to said roof panel.

5. A light distribution system for an automotive vehicle having a passenger compartment with a dome reflector and a map light reflector contained therein, a roof panel, and at least one door having a switch and an instrument cluster, said light distribution system comprising:

a light source mounted in a fixed location in the vehicle;

a plurality of light pipes located in a fixed relation to said light source, each light pipe having a first and second end, said first end having a face, said faces in combination substantially forming a ring having a predetermined width, said ring having an outer diameter and an inner diameter; and collector means for coupling light emitted by said light source into said first ends of light pipes by reflecting said light on said faces of said first ends of light pipe in a ring-shaped pattern having a predetermined area;

wherein said collector means secured within said door.

6. A light distribution system as recited in claim 5 wherein said second end of at least one of said light pipes connected to a switch on said door.

* * * * *